United States Patent [19]

Catoen

[11] Patent Number: 5,336,078

[45] Date of Patent: Aug. 9, 1994

[54] INJECTION MOLD HAVING A VENTED CORE

[75] Inventor: Bruce Catoen, Georgetown, Canada

[73] Assignee: Husky Injection Molding Systems Ltd., Bolton, Canada

[21] Appl. No.: 123,686

[22] Filed: Sep. 20, 1993

[51] Int. Cl.⁵ .............................................. B29C 45/22
[52] U.S. Cl. .................... 425/556; 264/334; 264/328.8; 264/328.12; 425/570; 425/573; 425/812
[58] Field of Search ............... 425/812, 570, 573, 577, 425/556, 554, 549; 264/328.8, 328.12, 334

[56] References Cited

U.S. PATENT DOCUMENTS 5,145,630 9/1992 Schad ................................... 425/570

*Primary Examiner*—Tim Heitbrink
*Attorney, Agent, or Firm*—Bachman & LaPointe

[57] ABSTRACT

The present invention relates to an apparatus for injection molding a thin-walled plastic article with substantially equal thickness sidewalls, a base portion, and a lip portion. The apparatus includes a two part mold arrangement in which a first part defines has a mold cavity and a second part defines a mold core. The first and second mold parts in a mold closed position define a mold space in the shape of the article being molded. The apparatus further includes two or more gates adjacent a lip portion of the mold space for injecting molten plastic material into the mold space and a bottom center venting arrangement. The apparatus further includes a restriction in the mold space for improving the operation of the bottom center venting arrangement and providing a more balanced filling in a multi-cavity molding machine.

11 Claims, 3 Drawing Sheets ion Mold Having a Vented Core

BACKGROUND OF THE INVENTION

The present invention relates to an apparatus for injection molding plastic articles and for an improved venting arrangement for use therein.

Various types of elongated, thin-walled, molded plastic articles are presently manufactured and used for many different purposes. Such articles include containers, open-ended pails, parts for ball-point pens, probe cover devices, and sheaths. A number of different molding apparatuses are used to manufacture these articles.

U.S. Pat. Nos. 3,660,002 to Morroni; 3,978,186 to Lovejoy; 4,381,275 to Sorensen; 4,622,002 to Bormuth; 4,726,925 to Binder; 4,743,420 to Dutt; and 4,764,103 to Mitake and published European Patent Application No. 0 124 951 to van Noort illustrate some of the apparatuses used to manufacture the aforementioned articles. Generally, each of the molding systems illustrated in these patents includes a mold having a first part defining a mold cavity and a second part defining a mold core. Each of the mold cores and respective mold cavities when in a mold closed position define a mold space in the shape of the article to be manufactured. In some systems, such as van Noort's, the mold cavity is defined by two parts which move relative to each other to facilitate removal of the molded article.

The plastic material used to form the molded article can be injected into the mold space in a variety of different ways. As shown in the Dutt and Mitake patents, it is known to inject the molten plastic material through a central gate adjacent the portion of the mold space forming the bottom of the molded article. This type of gating arrangement has traditionally been used in many injection molding machines. In other systems, such as that shown in the Sorenson patent, molten plastic material is injected into the mold space through gates positioned along sidewall defining portions of the mold space. Still further, it is known to inject molten plastic material into that portion of the mold space defining a lip of the article. The Bormuth patent illustrates one such system.

Another patent which illustrates a system for injecting molten plastic material into the lip portion of the space defining the article to be molded is U.S. Pat. No. 5,145,630 to Schad. In the Schad system, the molten plastic material is injected into the mold space at the lip portion using multiple injection gates in a manner which does not sacrifice core/cavity alignment. In other words, the molten material is injected into the mold space in a manner which substantially avoids shifting of the mold core.

Still another approach for injecting molten plastic material into a mold space defining a container is illustrated in U.S. Pat. No. 4,277,435 to Allen. In the Allen system, the plastic material is injected into the mold space near the lip defining portion of the mold space. It is injected somewhat tangentially to cause the plastic material to move peripherally in the rim defining portion of the mold space. This is done in order to have the weaker direction strengths also extend peripherally and thereby increase the container's resistance to lengthwise splitting from the rim to the bottom. The system used by Allen vents the mold adjacent the bottom defining portion of the mold space.

Mold venting is significant in that every mold contains air that must be removed or displaced as the mold space is being filled with plastic material. At high speed injection, insufficient mold venting may produce a considerable compression of the air, with consequent slow or incomplete mold filling, premature plastic pressure buildups, and, in extreme cases, burning of the plastic. The *Injection Molding Handbook* edited by Dominick V. Rosato et al., published by Van Nostrand Reinhold Company, discusses the significance of mold venting on pages 186–189.

U.S. Pat. No. 4,126,291 to Gilbert et al. illustrates an apparatus for molding thermometer probe covers having a bottom venting arrangement. The apparatus includes a tungsten carbide core which minimizes core deflection to maintain improved concentricity of core and cavity. Maintenance of concentricity is improved by a combination of a relatively loose cantilevered mounting of an end of the core together with a press fit locking of the core upon the closing of the mold. Venting of cavity gas during injection of the mold material is controlled through symmetrically distributed vent orifices in both the core and the female mold parts. Core venting is controlled by a plurality of orifices and a manifold provided by a water cooled core vent pin within a bore of the core. This venting feature is shown in FIGS. 8, 9, 10, 11, and 16.

When making plastic articles using rim gating techniques, such as those shown in the Schad patent, there have been problems in obtaining proper venting of the mold space. In some situations where there was a core shift, a large burn mark would appear on the bottom of the part where air had been trapped due to inadequate or inefficient venting. In a production environment, it is highly desirable to have a venting arrangement that substantially avoids the problem of burning and significantly reduces the sensitivity of the molding apparatus to core shift.

Accordingly, it is an object of the present invention to provide a molding apparatus with an improved venting arrangement.

It is a further object of the present invention to provide a molding apparatus as above with a venting arrangement that helps to substantially avoid problems such as burning and reduces the sensitivity of the mold apparatus to core shift.

It is still another object of the present invention to provide a molding apparatus as above with an improved venting arrangement that can be used with a rim gate injection system.

Still other objects and advantages of the present invention will become more apparent from the following description and the accompanying drawings in which like reference numerals depict like elements.

SUMMARY OF THE INVENTION

In accordance with the present invention, an injection molding apparatus is provided for manufacturing thin-walled plastic articles having substantially equal thickness sidewalls, a base portion and a lip portion. The apparatus comprises a two part mold in which a first part defines a mold cavity and a second part defines a mold core. The first and second parts in a mold closed position define a mold space in the shape of the plastic article to be molded. The apparatus further comprises means for injecting molten material, such as molten plastic resin, into the mold space. In a preferred embodiment, the injecting means comprises two or more injection gates positioned adjacent that portion of the mold space defining the lip portion of the plastic article. Plastic material is preferably injected through the gates substantially simultaneously in order to reduce the likelihood of core shift.

The apparatus further has means for venting air from the mold space as the molten material is injected therein. The venting means preferably comprises a bottom center venting arrangement. To improve the operation of the venting means, the apparatus includes means for restricting the flow of molten material through the mold space. In a preferred embodiment, the restricting means comprises the bottom portion of the mold space having a thickness that is smaller than the thickness of the sidewall defining portions of the mold space.

Still other features of the present invention are set forth in the following description.

DETAILED DESCRIPTION

Figure 1:
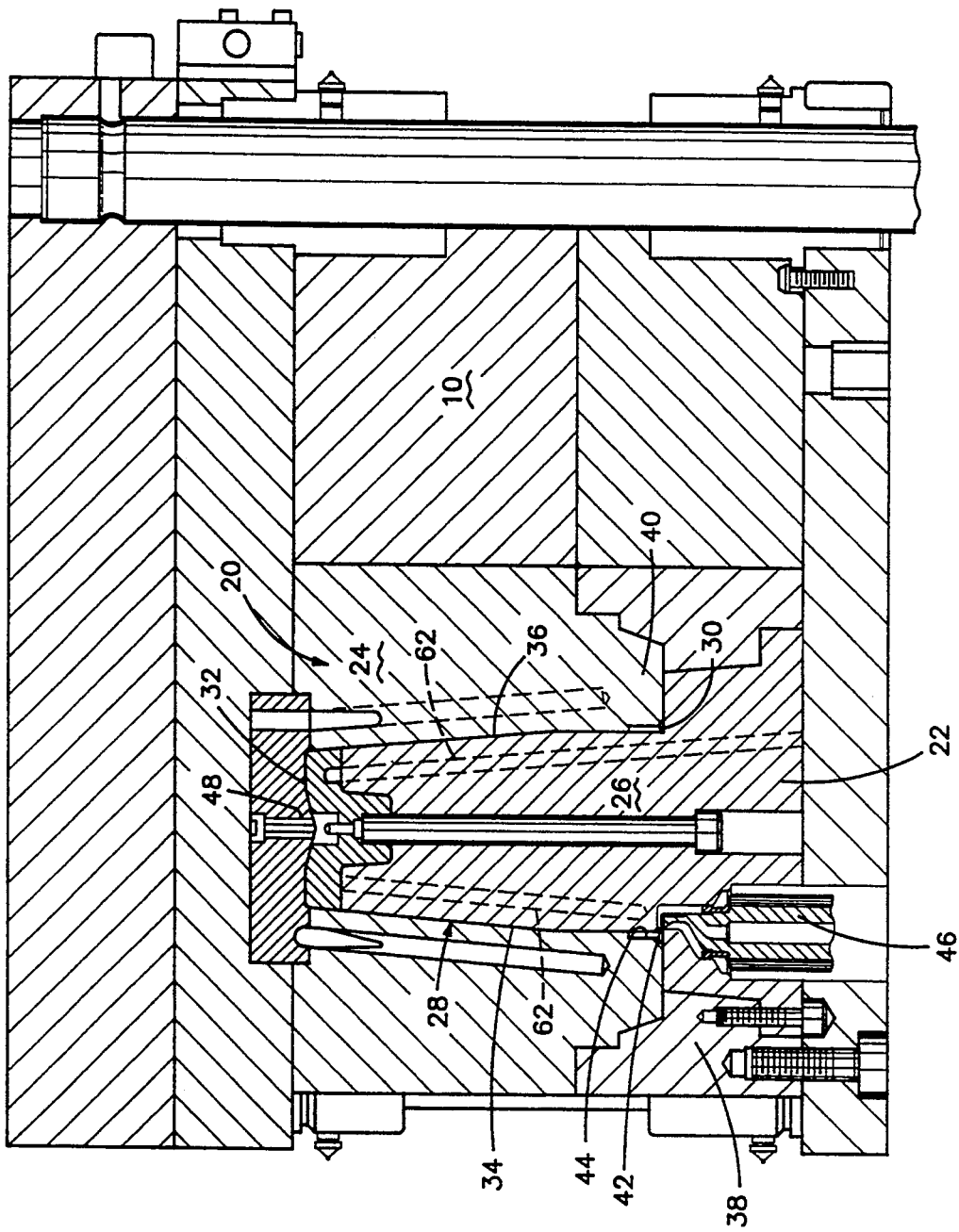
FIG. 1 illustrates a sectional view of an injection molding apparatus in accordance with the present invention.
Figure 4:
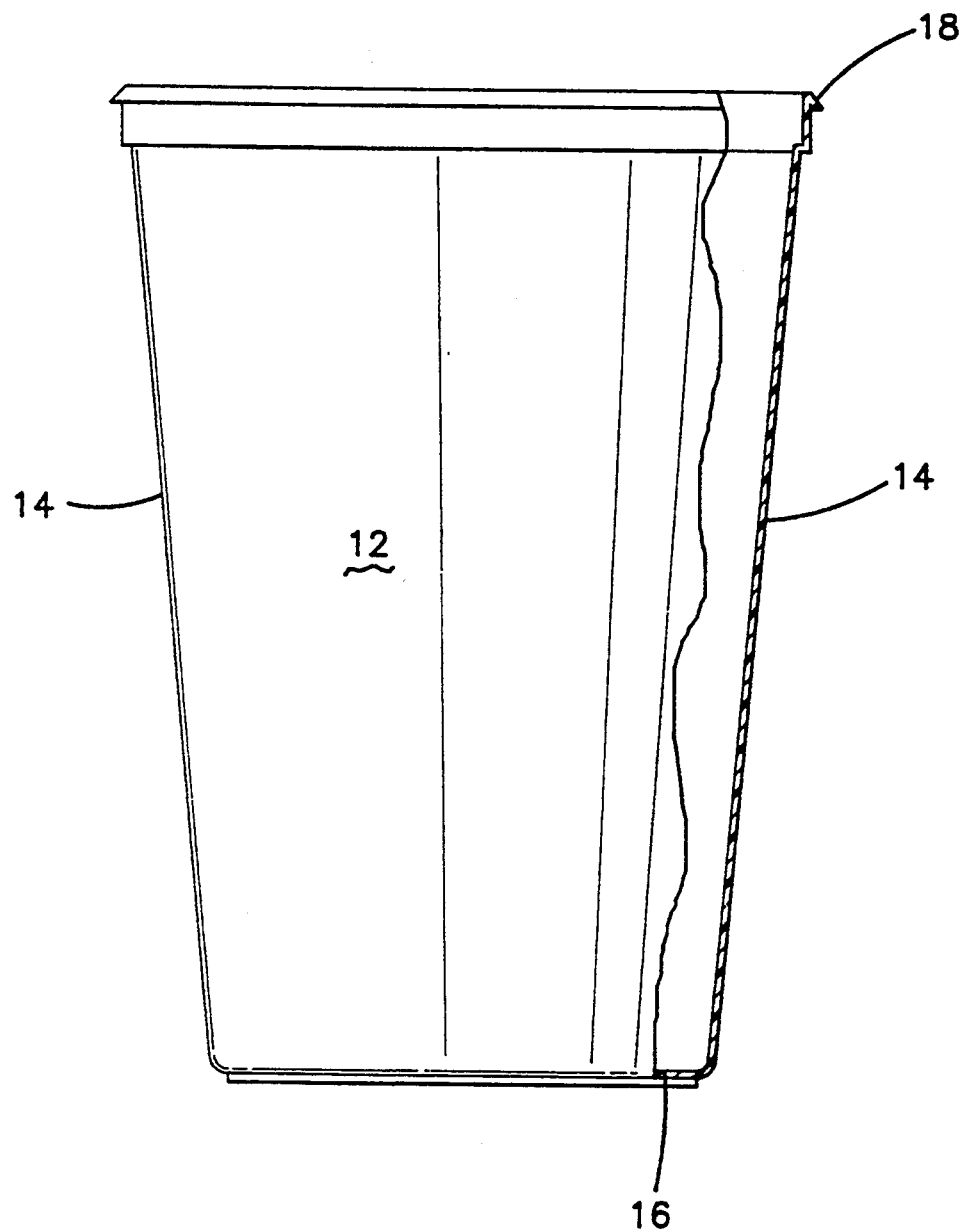
FIG. 4 illustrates an article produced by the molding apparatus of FIG. 1.

Referring now to the drawings, FIG. 1 illustrates an apparatus 10 for injection molding a thin-walled plastic article 12 such as the container having substantially equal thickness sidewalls 14, a base portion 16 and a lip portion 18 shown in FIG. 4.

The injection molding apparatus 10 comprises a mold stack having mold halves 20 and 22. The first mold half 20 defines a mold cavity 24, while the second mold half 22 defines a mold core 26. Means (not shown) are provided to move the first and second mold halves 20 and 22 relative to each other between a mold open position and a mold closed position. For example, the mold half 20 may be secured to a fixed platen (not shown) while the mold half 22 may be secured to a movable platen (not shown). The stack mold assembly may include a lock ring 38 and tapers 40 for mechanically aligning the mold halves along the axis A—A. Alignment of the mold halves is important from the standpoint of producing a molded article having sidewalls with a substantially uniform thickness.

When the mold halves 20 and 22 are in their closed position (as shown in FIG. 1), the mold cavity 24 and the mold core 26 define a mold space 28 in the shape of the article to be molded. The mold space 28 has a first portion 30 defining the lip portion of the article to be molded, a second or base portion 32 defining the base portion of the article to be molded, and sidewall portions 34 and 36 between the first and second portions defining the sidewalls of the article being molded. The sidewall portions 34 and 36 each preferably have the same thickness $t_{wall}$, while the base portion 32 has a thickness $t_{bot}$. For reasons to be discussed hereinafter, the thickness $t_{bot}$ is less than the thickness $t_{wall}$ of each of the respective sidewall portions 34 and 36.

As previously discussed, articles such as that shown in FIG. 4 have been traditionally produced by directly gating molten plastic material into the bottom of the mold space defined by the mold core and the mold cavity. The principal deficiency of this approach is that it becomes increasingly difficult to properly pack the lip defining portion of the mold space and to eliminate sink marks when the plastic material must be forced through the restriction of a very thin sidewall from a gate at the bottom of the part. To avoid this problem, the apparatus 10 of the present invention includes means 42 for directly gating molten plastic material into the first or lip defining portion 30 of the mold space 28. Another rim gating advantage over bottom center gating is reduced clamp tonnage (up to 40% less) because the highest pressure area on a rim gate has a very small projected area. Also, rim or any multiple gating approach has less core shift which in turn produces less short/flash problems in multi-cavity tools.

As shown in FIG. 1, molten plastic material can be directly gated into the first portion 30 using two gates 42 positioned adjacent the first portion. Each of the gates 42 is preferably positioned adjacent an inside edge 44 of the mold space 28. The gates 42 are preferably spaced 180° apart. Furthermore, each gate 42 communicates with a hot runner nozzle 46 through which molten plastic material such as one or more plastic resins is supplied.

In operation, molten plastic material is introduced into the lip defining portion 30 simultaneously through the two gates 42. When the molten plastic material is supplied into the annular lip area 30, the plastic material will flow around the first portion 30 to encircle the core and fill the sidewall portions 34 and 36. As the plastic advances toward the base portion 32 of the mold space 28, air becomes trapped and compressed in the remaining mold space. A center bottom vent arrangement 48 is provided to permit air within the mold space 28 to escape. As previously discussed, it is important to vent this air from the mold space in a manner which avoids problems such as burn marks.

Figure 2:
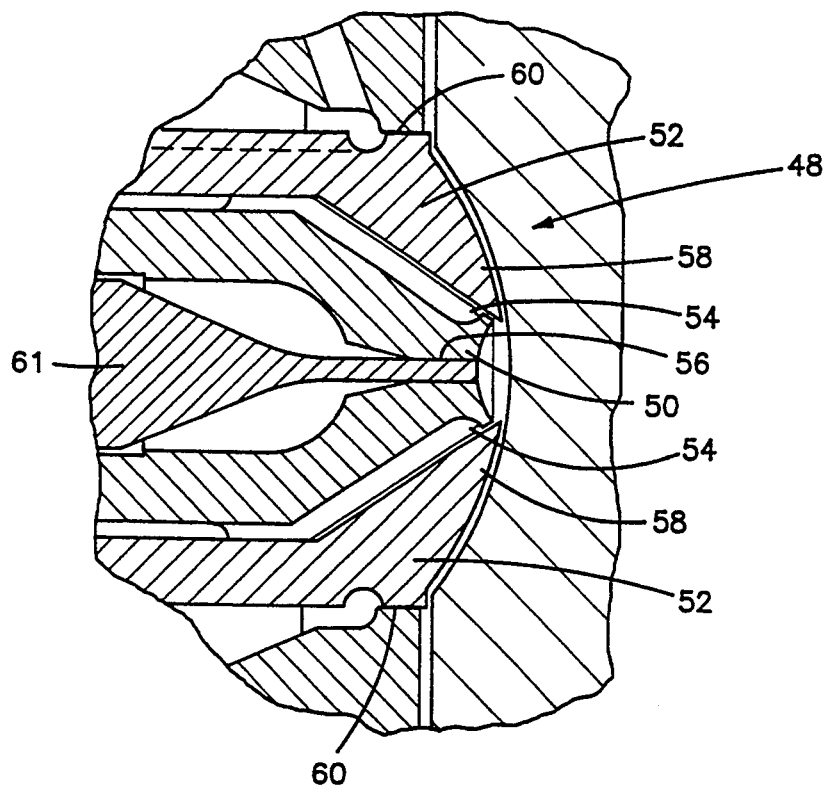
FIG. 2 illustrates an exploded view of the bottom center venting arrangement used in the injection molding apparatus of FIG. 1 with the venting arrangement in a before injection mode.
Figure 3:
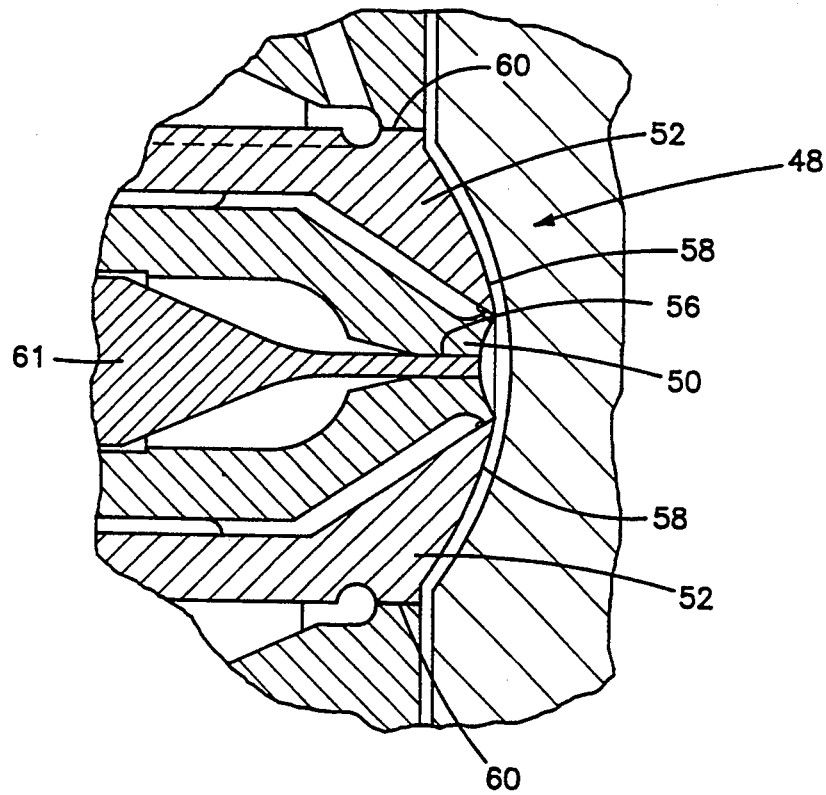
FIG. 3 illustrates an exploded view of the venting arrangement of FIG. 2 in an after injection mode.

The bottom vent arrangement 48 employed in the apparatus 10 is shown in FIGS. 2 and 3 with FIG. 2 showing the vent arrangement in a before injection mode and FIG. 3 showing the vent arrangement in an after injection mode. The bottom vent arrangement 48 comprises a central vent member 50, a movable sleeve portion 52 surrounding the central vent member which moves relative to the central vent member to open and close main vents 54, and peripheral vent 60. The central vent member 50 is a stationary member having a peripheral vent 56 around vent pin 61 for venting air from the mold space 28.

As shown in FIG. 2, the sleeve portion 52 is normally advanced slightly ahead of the central vent member 50 in the before injection mode to ensure that the main vents 54 are open. A disc spring is used to hold it in a forward position. As the injected molten plastic material fills the base portion 32, it flows over the faces 58 of the sleeve portion 52 and pushes the movable sleeve portion back so that the sleeve portions appear as shown in FIG. 3. As a consequence of this action, the main vents 54 are closed before the resin reaches them.

The peripheral vent 56 is centrally provided in the central vent member 50 to ensure that the very last portion of trapped air can escape because when the molten plastic material reaches vent 56, the main vents 54 will be closed. Preferably, vent 56 is small enough to prevent molten plastic material from entering it.

The peripheral vent 60 occurs naturally since it is located between the movable sleeve portion 52 and a fixed part. Preferably, the vent 60 is small enough not to allow plastic material to enter it.

Should the plastic material terminate over the center of pin 61, the remaining air can be provided with a path back to vent 56 by way of using a roughened surface on the face of the pin. On a microscopic level the plastic will not fill all the valleys of the roughened surface, thereby providing interconnecting void areas which lead back to vent 56, to aid in the final evacuation of air.

It has been found that this venting arrangement works well whenever the molten plastic material flow front terminated over the central vent member. Unfortunately, this situation occurs only when there is almost no core shift, i.e. less than 0.02 mm. In cases where the core shift was larger, a burn mark would sometimes appear on the bottom of the part, away from the venting arrangement 48, where the air had been trapped without venting. Thus, it is important to reduce the sensitivity of the vent arrangement 48 to core shift.

It has been found that this goal can be achieved by reducing the thickness $t_{bot}$ of the base portion 32 of the mold space 28 as compared to the thicknesses $t_{wall}$ of the sidewall portions 34 and 36. By providing a thinner base portion 32, a restriction is created which allows the plastic material flow front through sidewall portions 34 and 36 to catch up at the transition to the base portion, even when the core had shifted. Thus a more symmetrical, concentric flow is produced in the base portion which guides the molten plastic material and the air to the bottom center of the mold space 28 where it can be vented using the bottom center venting arrangement 48.

The present invention takes into account the fact that the higher the degree of core shift, the thinner the base portion 32 has to be for a given mold arrangement in order to obtain symmetrical flow to the vent. It also takes into account that for the base portion 32 to act as a restriction, it must be thinner than sidewall sections 34 and 36 including any thinning of the sidewall thickness due to core shift.

In mold arrangements where the core shift can be determined, it has been found that the relationship between the side wall thickness $t_{wall}$ and the base portion thickness $t_{bot}$ should preferably be in accordance with the following equation:

$$t_{bot} = 0.75 \times t_{wall}(\min) - \text{core shift} \quad (1)$$

where the core shift is the degree of shifting of the mold core 26 and is a function of the core construction, the height H of the core, the largest diameter D of the article being molded; e.g. the lip diameter, and the L/t ratio and where $t_{wall}(\min)$ is the minimum sidewall thickness for the part being molded. As used herein, the term L/t ratio refers to the length of the plastic flow divided by the wall thickness. Core construction is taken into account because there are several ways to align the core to the cavity, i.e. cavity lock, core lock, taper locks, double taper and stripper rings. Some are better at alignment than others. If the stack construction is weak (not robust enough) then it will deflect easier under injection pressure. Therefore, this must be taken into account when predicting expected core shift.

In situations where it is not possible to determine the core shift, then the thickness $t_{bot}$ may be approximated by the following equation:

$$t_{bot} = HD \times t_{wall}(\min) \quad (2)$$

where
HD = 0.65 for H/d > 2,
HD = 0.75 for 2 < H/d < 1,
HD = 0.85 for H/d < 1, and
H/d = the height of the article being molded/the diameter of the bottom of the article being molded.

It has been found that in general, the thinner the bottom, the better the venting. However, there is a limit as to how thin the base portion 32 can be due to the impact and top load strength requirements of the article being molded. It can be seen from the foregoing that an advantageous injection molding apparatus has been described wherein efficient venting of the mold space defined by the mold core and the mold cavity can be achieved.

Furthermore in molding machines having a plurality of cavity spaces 28 formed by mold core and mold cavity means (not shown), it has been found that a restriction provided in the base portion 32 of all the cavity spaces balances the flow position from one cavity space to another. That is, the first cavity space to fill to the restricted base portion would hesitate it its momentum to fill the base portion, as the plastic in a slower filling cavity space was given a chance to reach the restricted base portion. Typically, in multi-cavity tools it is a struggle to balance cavity filling so that one part does not come out over packed with flash and another part not packed enough. The restricted base portion of the present invention effectively reduces the final flow length from which all the cavities will commence filling at substantially the same time, increasing the balance and packing quality of the molded articles regardless of the overall flow length.

After the plastic material has completely filled the mold space 28, solidification occurs through cooling of the mold halves. Any suitable means known in the art may be used to effect such cooling. For example, cooling may be effected by flowing a coolant fluid through cooling channels 62 in the mold core and/or mold cavity portions of the mold. Once the article being molded has been solidified on the mold core, the mold halves may be moved to the mold open position where the article is ejected from the mold core. Using the molding apparatus of the present invention, there is no need for vacuum and blow off air to eject the molded article. Instead, the molded article can remain on the mold core during mold opening and can be ejected off the core in a conventional manner. For example, core poppets or an air blow-off arrangement could be used to eject the molded article off the core.

While the apparatus has been shown as having two gates for injecting molten material into the mold space, it should be recognized that more than two gates could be used to inject the molten plastic material. When more than two gates are employed, it is preferred to space them equally around the periphery of the portion of the mold space defining the lip portion of the article being molded.

It is apparent that there has been provided in accordance with this invention a bottom center venting arrangement for an injection molding apparatus which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the broad scope of the appended claims.

What is claimed is:

1. An apparatus for injection molding a thin-walled plastic article with sidewalls, a base portion, and a lip portion, said sidewalls having a substantially equal thickness, said apparatus comprising:
   a two part mold in which a first part defines a mold cavity and a second part defines a mold core;
   said first and second parts in a mold closed position defining a mold space in the shape of said plastic article;
   means for injecting molten material into said mold space;
   means for venting air from said mold space as said molten material is injected therein;
   said mold space including means for restricting the flow of said molten material through said space and for improving the operation of said venting means;
   said restricting means serving to balance the flow of said molten material in said mold space;
   said mold space having sidewall defining portions of a first thickness and a bottom defining portion of a second thickness; and
   said restricting means comprising said second thickness being smaller than said first thickness.

2. The apparatus of claim 1 further comprising said second thickness being defined by the equation:

$$t_{bot} = 0.75 \times t_{wall}(\min) - \text{core shift}$$

where
   $t_{bot}$ = said second thickness;
   $t_{wall}\min$ = a minimum value for said first thickness; and
   core shift = a degree of shifting of said mold core.

3. The apparatus of claim 1 further comprising said second thickness being defined by the equation:

$$t_{bot} = HD \times t_{wall}(\min);$$

where
   $t_{bot}$ = said second thickness;
   $t_{wall}(\min)$ = a minimum value for said first thickness; and
   HD = a variable dependent upon the ratio of the height of said plastic article to the bottom diameter of said plastic article.

4. The apparatus of claim 1 wherein said injecting means comprises at least two gates spaced about a portion of said mold space defining the lip portion of said article.

5. The apparatus of claim 4 wherein said injecting means further comprises a hot runner nozzle associated with each of said at least two gates.

6. The apparatus of claim 1 further including means for ejecting said plastic article from said second part when said mold parts have been moved into an open position.

7. An apparatus for injection molding thin-walled plastic articles each having sidewalls, a base portion, and a lip portion, said sidewalls having a substantially equal thickness, said apparatus comprising:
   means for defining a plurality of mold spaces for producing said plastic articles;
   means for injecting molten material into said mold spaces;
   means for venting air from each said mold space as said molten material is injected therein;
   each said mold space including means for restricting the flow of said molten material through said space and for improving the operation of said venting means, said restricting means serving to balance the flow of said molten material in said mold spaces;
   each said mold space having sidewall defining portions of a first thickness and a bottom defining portion of a second thickness; and
   said restricting means for each mold space comprising said second thickness being smaller than said first thickness.

8. An apparatus for injection molding a thin-walled plastic article with sidewalls, a base portion, and a lip portion, said sidewalls having a substantially equal thickness, said apparatus comprising:
   a two part mold in which a first part defines a mold cavity and a second part defines a mold core;
   said first and second parts in a mold closed position defining a mold space in the shape of said plastic article;
   means for injecting molten material into said mold space;
   means for venting air from said mold space as said molten material is injected therein;
   said mold space including means for restricting the flow of said molten material through said space and for improving the operation of said venting means; and
   wherein said venting means comprises a first vent member and a sleeve portion surrounding said first vent member, said sleeve portion being movable relative to said first vent member and defining main vents with said first vent member for removing air from a bottom portion of said mold space.

9. The apparatus of claim 8 wherein said venting means further comprises a centrally positioned vent passageway within said first vent member, said centrally positioned vent passageway removing air from the bottom portion of said mold space when said main vents are closed.

10. An apparatus for injection molding a thin-walled plastic article with sidewalls, a base portion, and a lip portion, said sidewalls having a substantially equal thickness, said apparatus comprising:
    means for defining a plurality of mold spaces for producing said plastic articles;
    means for injecting molten material into said mold spaces;
    means for venting air from each said mold space as said molten material is injected therein;
    each said mold space including means for restricting the flow of said molten material through said space and for improving the operation of said venting means, said restricting means serving to balance the flow of said molten material in said mold spaces; and
    wherein the venting means for each said mold space comprises a first vent member and a sleeve portion surrounding said first vent member, said sleeve portion being movable relative to said first vent member and defining main vents with said first vent member for removing air from a bottom portion of said mold space.

11. The apparatus of claim 10 wherein said venting means further comprises a centrally positioned vent passageway within said first vent member, said centrally positioned vent passageway removing air from the bottom portion of said mold space when said main vents are closed.

* * * * *